United States Patent
Baldi et al.

(10) Patent No.: US 12,451,103 B2
(45) Date of Patent: Oct. 21, 2025

(54) AUTOMATIC ADJUSTMENT OF OPERATING CHARACTERISTICS OF MOBILE ELECTRONIC DEVICES

(71) Applicant: LiveWired, LLC, Carlsbad, CA (US)

(72) Inventors: Mark Baldi, Rancho Santa Fe, CA (US); Michael Lamb, Rancho Santa Fe, CA (US); Brett Worthington, Thousand Oaks, CA (US)

(73) Assignee: LiveWired, LLC, Carlsbad, CA (US)

( * ) Notice: Subject to any disclaimer, the term of this patent is extended or adjusted under 35 U.S.C. 154(b) by 0 days.

(21) Appl. No.: 18/491,437

(22) Filed: Oct. 20, 2023

(65) Prior Publication Data

US 2025/0131898 A1 Apr. 24, 2025

(51) Int. Cl.
| | |
|---|---|
| G06F 3/0346 | (2013.01) |
| G09G 5/02 | (2006.01) |
| G09G 5/10 | (2006.01) |
| H04N 5/76 | (2006.01) |
| H04N 23/63 | (2023.01) |

(52) U.S. Cl.
CPC ............. G09G 5/10 (2013.01); G06F 3/0346 (2013.01); G09G 5/02 (2013.01); H04N 5/76 (2013.01); H04N 23/631 (2023.01); G09G 2320/0626 (2013.01); G09G 2320/0666 (2013.01); G09G 2354/00 (2013.01)

(58) Field of Classification Search
CPC ............ G06F 3/0346; G09G 5/02; G09G 2320/0626; G09G 2320/0666; G09G 2354/00; H04N 5/76; H04N 23/631
See application file for complete search history.

(56) References Cited

U.S. PATENT DOCUMENTS

| | | | |
|---|---|---|---|
| 11,770,612 B1* | 9/2023 | Desai | H04N 23/6812 348/208.4 |
| 2009/0137286 A1* | 5/2009 | Luke | G06F 3/0346 455/567 |
| 2010/0066763 A1* | 3/2010 | Macdougall | G06F 1/1626 345/656 |
| 2011/0316888 A1* | 12/2011 | Sachs | G06F 3/0485 345/173 |
| 2012/0056802 A1* | 3/2012 | Iijima | A63F 13/44 345/156 |
| 2013/0234924 A1* | 9/2013 | Janefalkar | H04W 52/027 345/156 |
| 2014/0092002 A1* | 4/2014 | Manzari | G06F 3/0346 345/156 |
| 2015/0179226 A1* | 6/2015 | Willard | G11B 27/031 386/241 |
| 2016/0360256 A1* | 12/2016 | Van Os | A63F 13/215 |
| 2018/0248991 A1* | 8/2018 | Ryu | H04M 1/72469 |

(Continued)

*Primary Examiner* — Md Saiful A Siddiqui
(74) *Attorney, Agent, or Firm* — Thibault Patent Group (57) ABSTRACT

An apparatus and method for automatically adjusting of one or more operating characteristics of a mobile electronic device. When a mobile electronic device is recording video, a user interface of the mobile electronic device is automatically adjusted in response to determining that the mobile electronic device has been physically manipulated in one or more particular ways. For example, a touch screen may be dimmed while the mobile electronic device is recording video and the mobile electronic device determines that it has been raised above a user's head.

18 Claims, 4 Drawing Sheets

(56) References Cited

U.S. PATENT DOCUMENTS

| | | | |
|---|---|---|---|
| 2019/0199924 A1* | 6/2019 | Liu ...................... | H04N 23/631 |
| 2022/0191400 A1* | 6/2022 | Wada .................... | H04N 23/683 |
| 2023/0216948 A1* | 7/2023 | Ahn ...................... | G06F 1/1694 |
| | | | 455/575.4 |
| 2024/0223894 A1* | 7/2024 | Parulski ............... | H04N 23/667 |

* cited by examiner

AUTOMATIC ADJUSTMENT OF OPERATING CHARACTERISTICS OF MOBILE ELECTRONIC DEVICES

BACKGROUND

I. Field of Use

The present application relates to the field of consumer electronics. More specifically, the present application relates to automatic adjustments of operating characteristics of mobile electronic devices during certain situations.

II. Description of the Related Art

In recent years, people have begun using their mobile electronic devices, such as mobile phones, to record live events, such as concerts, sporting events, etc. With mobile phones now ubiquitous, this type of behavior is becoming more prevalent, whereby event attendees raise their devices in the direction of the event in order to record, or stream, the audio and/or visual content.

As the number of people recording/streaming live events increases, it poses a problem for other people in the vicinity of such a recording. Namely, the light emitted from the mobile phone's display is typically bright, resulting in a distraction from the event, especially in typically darkened venues.

It would be desirable to reduce or eliminate the brightness caused by mobile electronic displays while events are being recorded and, ideally, still allowing a phone operator the ability to adjust phone settings to obtain desired recordings.

SUMMARY

The embodiments described herein relate to methods and apparatus for automatically altering operating characteristics of a mobile electronic device. In one embodiment, an apparatus is described, comprising a camera, a user interface, a memory for storing processor-executable instructions, and a processor coupled to the camera, the user interface and the memory, for executing the processor-executable instructions that causes the processor to receive a command from the user interface to begin video recording via the camera, after receiving the command to begin recording, determine that the mobile electronic device has been physically manipulated in a predetermined manner, and in response to determining that the mobile electronic device has been physically manipulated in the predetermined manner, automatically adjust an operating characteristic of the mobile electronic device.

In another embodiment, a method, performed by a mobile electronic device, is described, comprising receiving, by a processor of the mobile electronic device, a command via a user interface coupled to the processor to begin a video recording via a camera of the mobile electronic device coupled to the processor, after receiving the command to begin recording, determining, by the processor, that the mobile electronic device has been physically manipulated in accordance with a predetermined manner, and in response to determining that the mobile electronic device has been physically manipulated in the predetermined manner, adjusting, by the processor, an operating characteristic of the mobile electronic device.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to methods and apparatus for automatically adjusting certain operational characteristics of a mobile electronic device, such as a cellular phone, smart phone, video camera, wearable device, etc. in certain situations. In particular, the present application describes various techniques to minimize or eliminate disruptions caused by the display of mobile devices during video recording of live events. In some embodiments, as a mobile electronic device is raised in order to record video of an event, one or more operating characteristics of the mobile electronic device may be automatically changed, such as reducing a brightness of a display screen of the mobile electronic device, changing the color of light eminating from the display (i.e., from white or full color to red), disable the user interface, etc.

Figure 1:
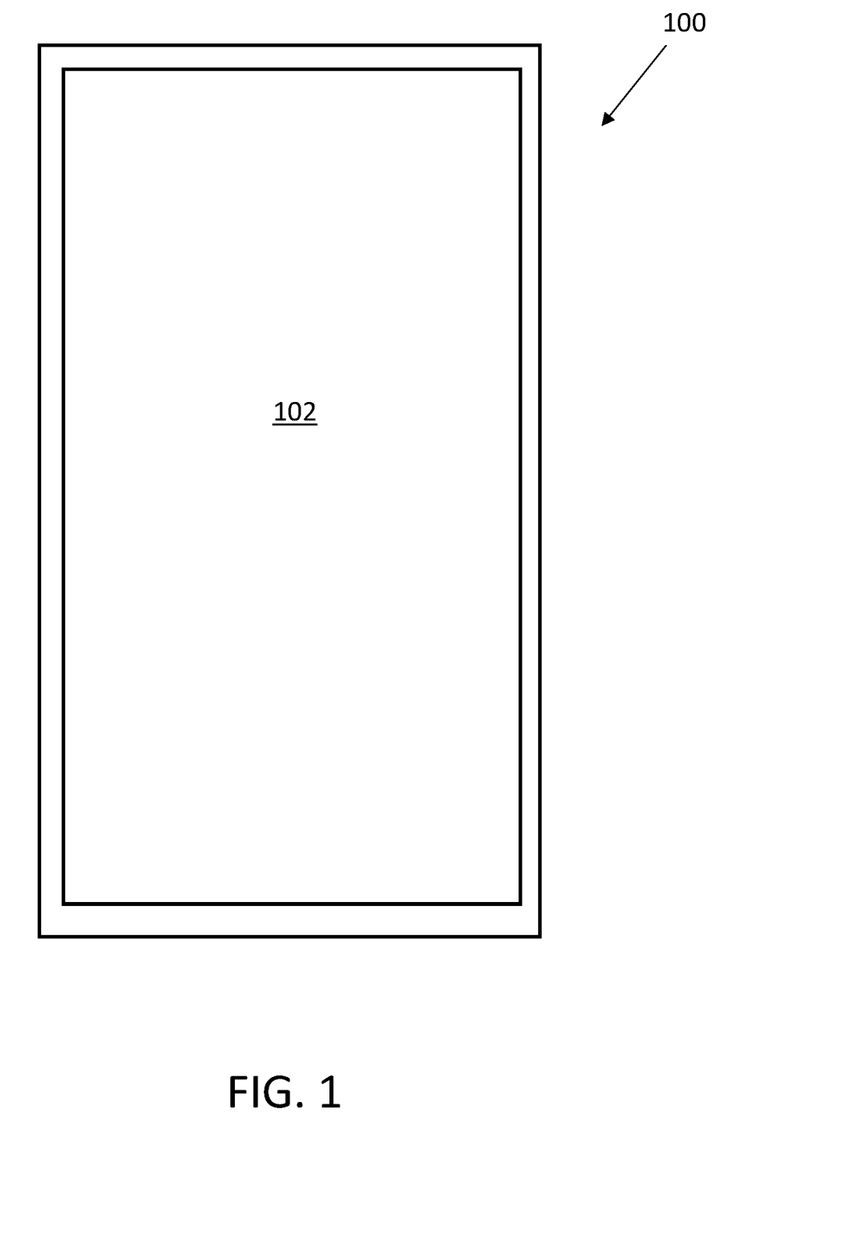
FIG. 1 is a plan view of one embodiment of a mobile electronic device, in this embodiment, a mobile phone equipped with an internal camera and a user interface in the form of a touch screen, embodying the inventive concepts described herein.

FIG. 1 is a plan view of one embodiment of a mobile electronic device mobile electronic device 100, in this embodiment, a mobile cellular phone equipped with an internal camera (not shown) and a user interface 102 in the form of a touch screen, embodying the inventive concepts described herein. In other embodiments, mobile electronic device 100 comprises a digital video camera, wearable device, or any other electronic device that can record video. Mobile electronic device 100 may be used for a variety of functions, including cellular communications, text messaging, surfing the Internet, taking electronic photos or video, etc. A user of mobile electronic device 100 will typically set certain operating characteristics of mobile electronic device 100, such as a brightness of user interface 102, a volume of mobile electronic device 100, etc. These settings are used most of the time. However, there may be times when it is desirable to automatically change one or more operating characteristics of mobile electronic device 100.

For example, while at an event, such as a concert, sporting event, wedding, or some other live event, a user of mobile electronic device 100 may wish to record video of the event by holding mobile electronic device 100 up in the air in order to obtain a clear line-of-site between mobile electronic device 100 and the event. Frequently, this means holding mobile electronic device 100 vertically in front of the user's face or above the user's head. In a darkened venue, the brightness of user interface 102 may be annoying to other event-goers as video of the event is being recorded. It may be desirable to alter one or more operating characteristics of mobile electronic device 100 in these kinds of recording situations, i.e., recording during a live event, especially in a darkened venue, where the brightness of user interface 102 is particularly noticeable.

Mobile electronic device 100 as shown in FIG. 1 may comprise a means for determining when mobile electronic device 100 is physically manipulated in a predetermined manner. For example, mobile electronic device 100 may comprise an accelerometer that can determine when mobile electronic device 100 is being accelerated upwards, indicating that mobile electronic device 100 may be being raised up to at least the user's eye level, if not raised above the user's head. Alternatively, or in addition, mobile electronic device 100 may comprise a gyroscope that may determine an orientation of mobile electronic device 100 as it is held by a user. In this embodiment, when mobile electronic device 100 is held in a substantially vertical position and in some embodiments, for a predetermined amount of time, such as between three and ten seconds, for example, mobile electronic device 100 may automatically adjust one or more operating characteristics of mobile electronic device 100.

Mobile electronic device 100 may be programmed to automatically adjust one or more operating characteristics of mobile electronic device 100 while recording a video and determining that mobile electronic device 100 has been physically manipulated in a predetermined manner. For example, user interface 102 may be dimmed when mobile electronic device 100 determines that mobile electronic device 100 has been manipulated in the predetermined manner. A color scheme of light emitted from user interface 102 could, additionally or alternatively, be altered from, for example, a full-color display to emitting only red light. Some colors, such as red, do not trigger a neutralization of rhodopsin, a protein found in rod cells of the human retina, which reduces the harsh effects of bright light in a dark environment. Additionally, or alternatively to the above, user interface 102 could be turned off completely. Finally, in addition or alternatively to the above, mobile electronic device 100 could automatically be silenced, i.e., a ringer of mobile electronic device 100 is disabled, preventing audio disruption to nearby event-goers in the event that a call or text is placed to mobile electronic device 100. In some embodiments, in addition to silencing the ringer, mobile electronic device 100 would prevent any change to user interface 102 when a text or phone call is received. Normally, when a text or phone calls received, user interface 102 illuminates to alert the user of the incoming communication.

Mobile electronic device 100 may be programmed to further automatically adjust one or more operating characteristics of mobile electronic device 100 when mobile electronic device 100 determines that mobile electronic device 100 has been physically manipulated in a second predetermined manner than discussed above. For example, after an operating characteristic of mobile electronic device 100 has been altered, as discussed above, mobile electronic device 100 may determine that it is being lowered towards the ground, i.e., after a user has finished recording a video, the user may lower mobile electronic device 100 in order to review the video, to place a phone call or text, to put mobile electronic device 100 away, etc. In another embodiment, additionally or alternatively to the above, mobile electronic device 100 may determine that an orientation of mobile electronic device 100 is no longer in substantially a vertical plane, indicating that the user has recording and is no longer pointing the phone towards the event. In any case, when mobile electronic device 100 determines that it has been manipulated in the second predetermined manner, mobile electronic device 100 may automatically alter one or more operating characteristics of mobile electronic device 100, for example, the operating characteristic(s) that was/were changed when mobile electronic device 100 was manipulated in the first predetermined manner may be returned back to its/their original setting prior to changing the operating characteristic(s). For example, if after determining that mobile electronic device 100 was raised above a user's head for a predetermined amount of time, and user interface 102 was dimmed, when mobile electronic device 100 determines that it has been lowered, it may return the brightness of user interface 102 to its original brightness before it was automatically dimmed.

Figure 2:
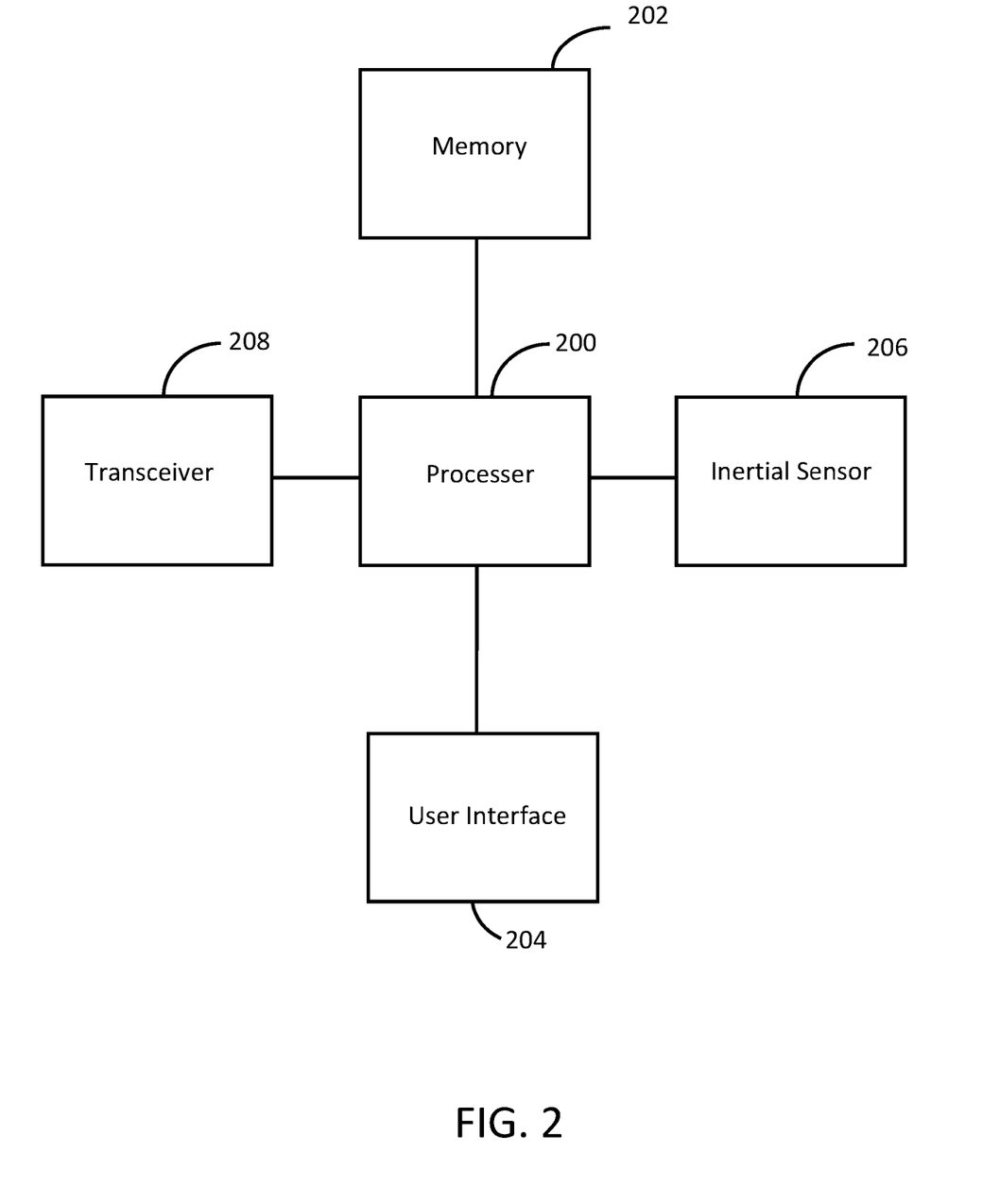
FIG. 2 represents a functional block diagram of the mobile electronic device as shown in FIG. 1, showing a processor, a memory, a user interface, an inertial sensor and a transceiver.

FIG. 2 is a functional block diagram of one embodiment of mobile electronic device 100, showing processor 200, memory 202, user interface 204, inertial sensor 206 and transceiver 208. It should be understood that not all of the functional blocks shown in FIG. 2 are required for operation of mobile electronic device 100 in some embodiments, that the functional blocks may be connected to one another in a variety of ways, and that not all functional blocks necessary for operation of mobile electronic device 100 are shown (such as a power supply), for purposes of clarity.

Processor 200 is configured to provide general operation of mobile electronic device 100 by executing processor-executable instructions stored in memory 202, for example, executable code. In one embodiment, processor 200 comprises an A16 Bionic SoC, used in a variety of iPhones, manufactured by Apple Inc. of Cupertino, California, although any one of a variety of microprocessors, micro-computers, and/or microcontrollers may be used alternatively. In some embodiments, processor 200 is selected based on power-consumption, size, and cost.

Memory 202 is coupled to processor 200 and comprises one or more information storage devices, such as RAM, ROM, flash memory, or some other type of electronic, optical, or mechanical memory device(s). Memory 202 is used to store processor-executable instructions for operation of mobile electronic device 100 as well as any information used by processor 200, such as one or more thresholds, operating characteristic settings, and other information used by the various functionality of mobile electronic device 100. It should be understood that memory 202 is non-transitory, i.e., it excludes propagating signals, and that memory 202 could be incorporated into processor 200, for example, when memory processor 200 is an SoC.

User interface 204 is coupled to processor 200 and configured for receiving user input in the form of tactile input and/or gestures, i.e., pressing or swiping user interface 102, when user interface 102 comprises a touchscreen display, commonly used in millions of mobile phones today. A touchscreen display advantageously allows user input while additionally providing a visual display representing output of mobile electronic device 100. In other embodiments, user interface 102 may comprise an electronic display that provides visual information to a user, however does not have touchscreen capabilities. In this case, some other sort of user input mechanism is used in conjunction with the display, such as physical buttons or keys. User interface 204 may additionally comprise a microphone for receiving audible commands from a user as well as a speaker for providing audible alerts to the user, such as a variety of ring tones used to alert a user to an incoming phone call or text message, for example. As used herein, "user interface" may comprise one or all of the foregoing.

A brightness of user interface 102, i.e., a touchscreen or a display screen, may be adjusted manually by a user and, in some cases, be set to automatically adjust to different lighting conditions. The display device of user interface 102 typically comprises a full-color electronic display for presenting visual information in full color. However, in accordance with the inventive principles described herein, either the brightness and/or the color emitted by user interface 102 may be automatically changed if certain manipulations of mobile electronic device 100 are detected.

Inertial sensor 206 is coupled to processor 200, comprising an accelerometer and/or a gyroscope, or some other spatial detector, for determining a position and/or orientation of mobile electronic device 100 in order to determine if mobile electronic device 100 has been physically manipulated a predetermined manner. Processor 200 receives signals from inertial sensor 206 and determines when mobile electronic device 100 has been manipulated in a predetermined manner by processing the signals. For example, an accelerometer may provide signals to processor 200 indicative of an acceleration of mobile electronic device 100 in an upwards direction, potentially indicating that mobile electronic device 100 is being raised at, or above, a user's head. Additionally, or alternatively, a gyroscope may provide signals to processor 200 indicative of an angular velocity of mobile electronic device 100 in six axes. Processor 200, in turn, may determine an orientation of mobile electronic device 100 based on the signals, i.e., whether mobile electronic device 100 is being held in substantially a vertical plane, indicating that mobile electronic device 100 is being pointed in a particular direction in order to record video of an event.

Transceiver 208 is coupled to processor 200, comprising well-known circuitry for allowing mobile electronic device 100 to communicate wirelessly with external devices using one or more well-known wireless protocols. For example, transceiver 208 may comprise circuitry for communications via cellular networks, Wi-Fi, Bluetooth, Zigbee, Zwave, etc. transceiver 208 may be configured to receive information relating to a location of mobile electronic device 100, as is well known in the art.

Figure 3A:
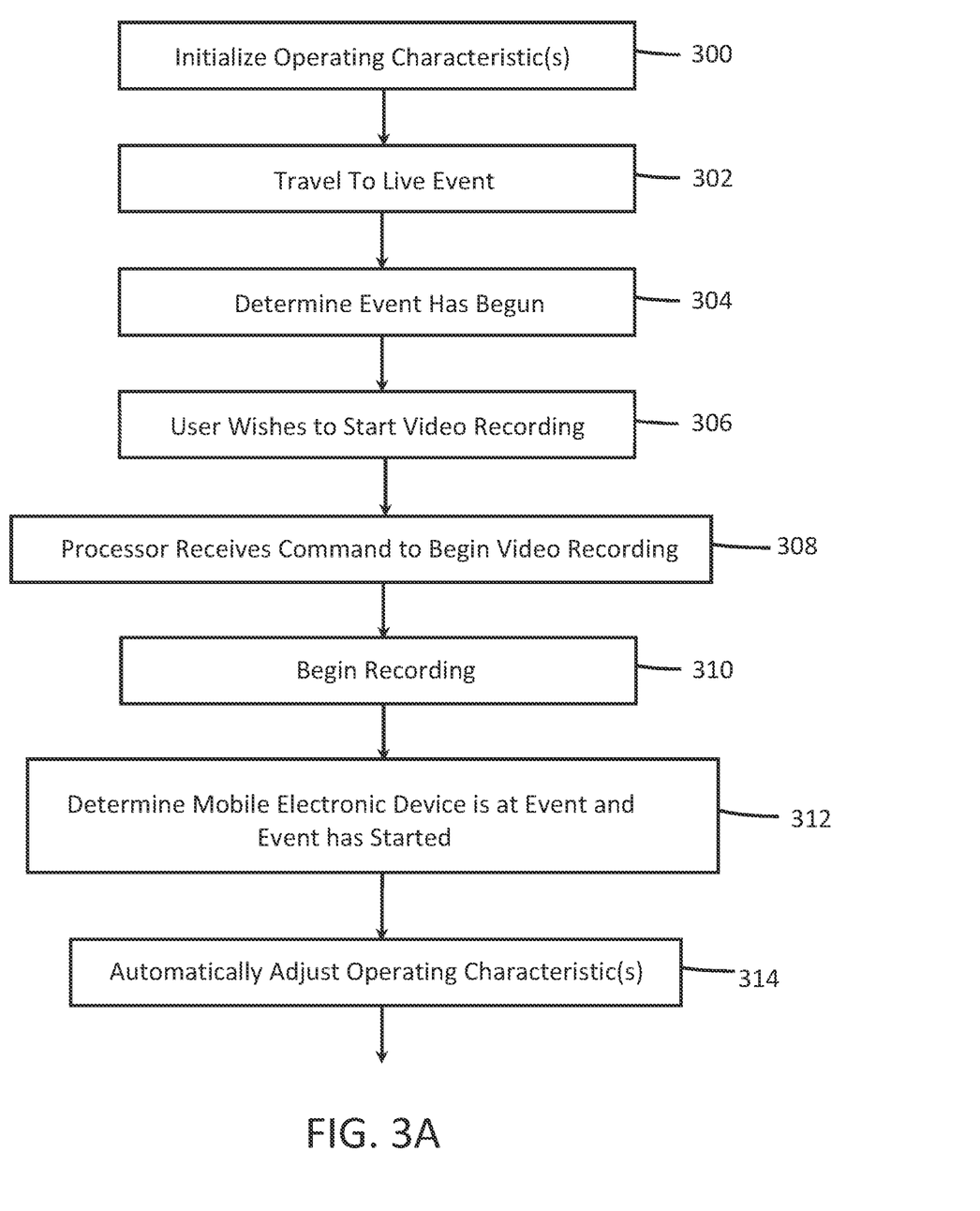
FIGS. 3A and 3B represent a flow diagram illustrating one embodiment of a method for automatically altering one or more operating characteristics of the mobile electronic device as shown in FIGS. 1 and 2.
Figure 3B:
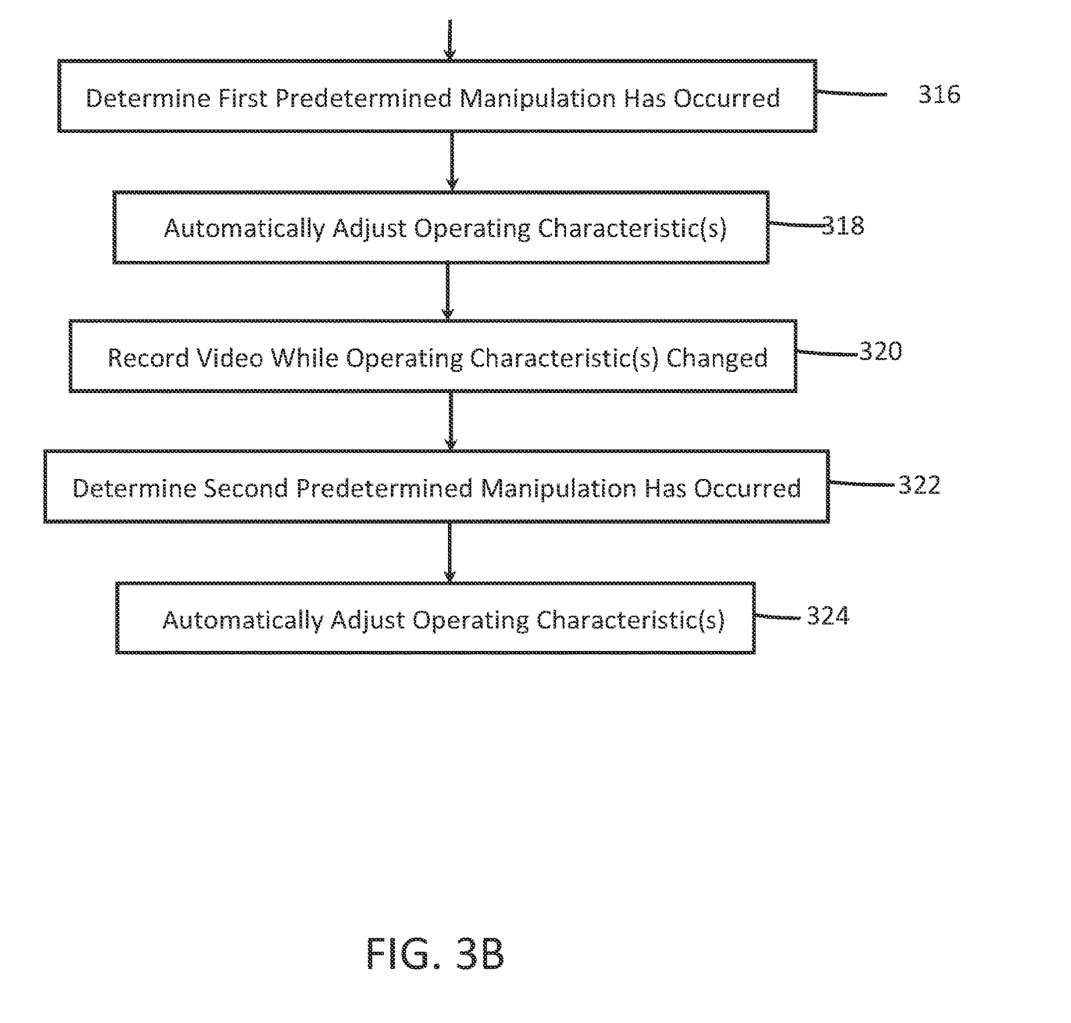

FIG. 3 is a flow diagram illustrating one embodiment of a method for automatically controlling one or more operating characteristics of mobile electronic device 100. It should be understood that in some embodiments, not all of the method steps shown in FIG. 3 are performed and that the order in which the steps are performed may be different in other embodiments.

At step 300, a user of a mobile electronic device, such as a smart phone, digital camera, wearable device, tablet computer, etc., may initialize one or more operating characteristics of mobile electronic device 100, such as setting the brightness of user interface 102, choosing one or more ring tones, setting a ring tone volume, choosing one or more Wi-Fi connections, and certain settings related to cellular functionality in devices that comprise cellular communication capabilities. For example, the user may decide whether or not to allow cellular data, whether or not to enable a hotspot, whether to enable a vibration mode, whether to silence mobile electronic device 100, whether to temporarily restrict receipt of texts and phone calls, i.e., a "do not disturb mode", etc.

At step 302, the user may travel to an event location, such as a stadium, concert hall, church, synagogue, playhouse, etc., at a date and time that the event is scheduled. In some embodiments, a user may have previously programmed mobile electronic device 100 to remind the user of the event, for example, calendaring the event in a calendaring app, or setting a reminder in a reminder app. In some cases, such calendaring or reminder app may allow a user to enter the date, time and location of the event.

At step 304, the event begins. Processor 200 may automatically determine the start of the event by comparing the present time to an anticipated start time as stored in memory 202 via a calendaring app and or a reminder app.

At step 306, the user may wish to record a video of the event.

At step 308, the user typically enters a command via user interface 102, which is provided to processor 200, in order to have mobile electronic device 100 begin video recording, in the form of a gesture or voice command entered via user interface 102.

At step 310, in one embodiment, in response to processor 200 receiving the command to begin video recording, processor 200 causes mobile electronic device 100 to begin a video recording.

At step 312, processor 200 may determine that mobile electronic device 100 is at a location of an event at the day of the event and within a predetermined time associated with the event. Processor 200 may automatically determine the location of mobile electronic device 100 using well-known techniques, such as GPS positioning, cellular triangulation methods, RF beacons, Bluetooth beacons, known Wi-Fi networks, or input from the user that mobile electronic device 100 is at the location of the event within a predetermined time of the event start time. For example, processor 200 may determine that mobile electronic device 100 is at a venue of an event and that the command to begin recording was received during the scheduled time of the event, such as between 7 µm and 11 µm, for example.

At step 314, in response to starting a video recording and determining that mobile electronic device 100 is at a location in accordance with the event and within the predetermined time, processor 200 may automatically adjust one or more operating characteristics of mobile electronic device 100. For example, processor 200 may cause one or more of the following to occur: dim a display of user interface 102 to a predetermined level; disable the display entirely; change the color output of light emitted from the display (i.e., to change the color emitted by the display to red or green, i.e., something other than white or full color); reduce the volume or disable a ringer of user interface 102 (i.e., to put mobile electronic device 100 in a silent mode); disable incoming wireless texts and phone calls or other notifications; and/or prevent the display of user interface 102 from illuminating in response to receiving a text or phone call.

At step 316, alternatively or in addition to determining that mobile electronic device 100 is at a location in accordance with the event and the current time is within the predetermined time related to the event as described step 312, above, in another embodiment, after processor 200 receives the command to begin a video recording, processor 200 may automatically change one or more operating characteristics of mobile electronic device 100 in response to determining that mobile electronic device 100 has been physically manipulated in one or more predetermined manners. For example, processor 200 may determine that mobile electronic device 100 has been raised at approximately a height of the user's head or above. In one embodiment, processor 200 determines that mobile electronic device 100 has been raised to approximately a height equal to the user's head, or above, by determining, via signals received from inertial sensor 206, that mobile electronic device 100 has been accelerated in an upwards direction, in one embodiment, the acceleration greater than a predetermined minimum acceleration that represents a user raising mobile electronic device 100 at, or over, their head. In a related embodiment, processor 200 may determine that mobile electronic device 100 has been accelerated in an upwards direction for a predetermined minimum and/or maximum amount of time, for example, a short time typically required to raise mobile electronic device 100 from a user's chest to above a user's head, for example, about one quarter of a second. Alternatively, or in addition to the above, processor 200 may determine, via inertial sensor 206, that mobile electronic device 100 has been manipulated into a position where mobile electronic device 100 is in a substantially vertical plane. This may indicate that mobile electronic device 100 is being pointed towards an event during video recording, as opposed to being held at an angle, indicating possible use during text messaging, web surfing or phone calls. In a related embodiment, processor 200 may determine that mobile electronic device 100 is in a substantially vertical plane for at least a predetermined time, such as three seconds or more. In this embodiment, it may be more likely that a user is using mobile electronic device 100 to record a video if mobile electronic device 100 is being held in a substantially vertical plane for several seconds or more.

At step 318, in response to determining one or more physical manipulations of mobile electronic device 100, processor 200 may automatically adjust one or more operating characteristics of mobile electronic device 100 such as dimming a display of user interface 102 to a predetermined level, disabling the display entirely, changing the color output of light emitted from the display (i.e., to change the color emitted by the display to red or green, i.e., something other than white or full color), reducing the volume or disabling a ringer of user interface 102 (i.e., to put mobile electronic device 100 in a silent mode), disabling incoming wireless texts and phone calls or other notifications, and/or preventing the display of user interface 102 from illuminating in response to receiving a text or phone call.

At step 320, mobile electronic device 100 records a video while it is being held in the air by the user as one or more operating characteristics have been adjusted by processor 200. For example, while mobile electronic device 100 is being held in the air recording the video, user interface 102 may be dimmed or disabled, light emanating from user interface 102 may be colored, and/or mobile electronic device 100 may be placed into a silent mode of operation, or any of the aforementioned operating characteristic adjustments. One or more of these adjustments help to minimize visual disruptions to nearby event-goers.

At step 322, processor 200 may determine that mobile electronic device 100 is being manipulated in a second predetermined manner. For example, processor 200 may determine, via signals from inertial sensor 206, that mobile electronic device 100 has been lowered from a raised position, towards the ground, for example, when the user is ready to stop recording. Processor 200 may determine that mobile electronic device 100 has being lowered via signals from inertial sensor 206 and, in one embodiment, determine that mobile electronic device 100 has been accelerated in a downward direction and, in a related embodiment, the acceleration was greater than a predetermined threshold, indicative of a user lowering mobile electronic device 100. In another embodiment, additionally or alternatively to determining that mobile electronic device 100 has been lowered, manipulation in the second predetermined manner comprises a determination by processor 200 that mobile electronic device 100 is no longer being held in a substantially vertical plane, indicative that the user is no longer pointing mobile electronic device 100 towards the event. In yet another embodiment, alternatively or in addition to the foregoing, manipulation in the second predetermined manner comprises a determination by processor 200 that the user is gazing at user interface 102. This may indicate that the user has lowered mobile electronic device 100 from a raised position and is looking at user interface 102 in preparation to stop the recording.

At step 324, after processor 200 has determined that mobile electronic device 100 has been physically manipulated in a second predetermined manner, processor 200 may adjust one or more operating characteristics of mobile electronic device 100. For example, processor 200 may return any operating characteristic that was changed back to its original setting immediately prior to detection of physical manipulation in the first predetermined manner. For example, if user interface 102 had been set to a brightness level of five and then automatically changed to a brightness level of one after detecting that mobile electronic device 100 had been raised into the air, processor 200 could return the brightness level back to a brightness level of five upon detecting that mobile electronic device 100 had been lowered towards the ground. Similarly, user interface 102 could be automatically re-enabled if it was previously disabled, the color of light emanating from user interface 102 could be automatically returned to full color if the color was changed to a single color to reduce annoyance, automatically exiting a silent mode of operation, etc.

In one embodiment, in addition to adjustment of one or more operating characteristics of mobile electronic device 100, processor 200 may automatically stop the video recording upon detection of manipulation of mobile electronic device 100 in the second predetermined manner.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:
1. A mobile electronic device, comprising:
a camera;
a user interface;
a memory for storing processor-executable instructions; and a processor coupled to the camera, the user interface and the memory, for executing the processor-executable instructions that causes the processor to:
    determine that the mobile electronic device is at a live event;
    receive a command from the user interface to begin video recording via the camera;
    after receiving the command to begin recording, determine that the mobile electronic device has been intentionally physically manipulated in a predetermined manner; and
    in response to determining that the mobile electronic is at the live event and that the device has been intentionally physically manipulated in the predetermined manner, and while the mobile electronic device is recording, automatically reduce a brightness of the user interface.

2. The mobile electronic device of claim 1, wherein the processor-executable instructions comprise further instructions that causes the processor to:
    turn the user interface off.

3. The mobile electronic device of claim 1, wherein the processor-executable instructions comprise further instructions that causes the processor to:
    change the color of light emanating from the user interface.

4. The mobile electronic device of claim 1, wherein the processor-executable instructions comprise further instructions that causes the processor to:
    cause the mobile electronic device to enter into a silent mode.

5. The mobile electronic device of claim 1, wherein the predetermined manner comprises raising the mobile electronic device above a user's head.

6. The mobile electronic device of claim 5, further comprising:
    an accelerometer coupled to the processor;
    wherein the processor-executable instructions for determining that the mobile electronic device has been physically manipulated in the predetermined manner comprises instructions that cause the processor to:
    determine, from signals from the accelerometer, that the mobile electronic device has been accelerated in an upwards direction.

7. The mobile electronic device of claim 6, wherein the processor-executable instructions for determining that the mobile electronic device has been physically manipulated in the predetermined manner comprises instructions that cause the processor to:
    determine that the acceleration has exceeded a predetermined minimum acceleration.

8. The mobile electronic device of claim 5, further comprising:
    an accelerometer coupled to the processor;
    wherein the processor-executable instructions for determining that the mobile electronic device has been physically manipulated in the predetermined manner comprises instructions that cause the processor to:
    determine that the mobile electronic device has been accelerated in an upwards direction for a predetermined minimum amount of time.

9. The mobile electronic device of claim 1, wherein the processor-executable instructions comprise further executable instructions that cause the processor to:
    after reducing a brightness of the user interface, determine that the mobile electronic device has been physically manipulated in a second predetermined manner; and
    in response to determining that the mobile electronic device has been physically manipulated in a second predetermined manner, return the brightness of the user interface back to its original setting prior to dimming the user.

10. A method performed by a mobile electronic device, comprising:
    determining that the mobile electronic device is at a live event;
    receiving, by a processor of the mobile electronic device, a command via a user interface coupled to the processor to begin a video recording via a camera of the mobile electronic device coupled to the processor;
    after receiving the command to begin recording, determining, by the processor, that the mobile electronic device has been intentionally physically manipulated in accordance with a predetermined manner; and
    in response to determining that the mobile electronic device is at the live event, and determining that the mobile electronic device has been intentionally physically manipulated in the predetermined manner, dimming, by the processor, a user interface of the mobile electronic device.

11. The method of claim 10, further comprising:
    turning, by the processor, the user interface off.

12. The method of claim 10, further comprising:
    changing, by the processor, the color of light emanating from the user interface.

13. The method of claim 10, further comprising:
    causing, by the processor, the mobile electronic device to enter into a silent mode.

14. The method of claim 10, wherein the predetermined manner comprises raising the mobile electronic device above a user's head.

15. The method of claim 14, wherein determining that the mobile electronic device has been physically manipulated in the predetermined manner comprises:
    determining, by the processor from signals received from an accelerometer coupled to the processor, that the mobile electronic device has been accelerated in an upwards direction.

16. The method of claim 15, wherein determining that the mobile electronic device has been physically manipulated in the predetermined manner comprises:
    determining, by the processor, that the acceleration has exceeded a predetermined minimum acceleration.

17. The method of claim 14, wherein determining that the mobile electronic device has been physically manipulated in the predetermined manner comprises:
    determining, by the processor from signals received from an accelerometer coupled to the processor, that the mobile electronic device has been accelerated in an upwards direction for a predetermined minimum amount of time.

18. The method of claim 10, further comprising:
    after dimming the user interface, determining, by the processor, that the mobile electronic device has been physically manipulated in a second predetermined manner; and
    in response to determining that the mobile electronic device has been physically manipulated in a second predetermined manner, return, by the processor, the brightness of the user interface back to its original brightness prior to dimming the user interface.

* * * * *